(12) United States Patent
Lazzaro

(10) Patent No.: US 11,143,231 B2
(45) Date of Patent: Oct. 12, 2021

(54) BLADE FLEXURE ASSEMBLY WITH REPLACEABLE ELEMENTS

(71) Applicant: The Boeing Company, Chicago, IL (US)

(72) Inventor: Anthony Lazzaro, Albuquerque, NM (US)

(73) Assignee: THE BOEING COMPANY, Chicago, IL (US)

(*) Notice: Subject to any disclaimer, the term of this patent is extended or adjusted under 35 U.S.C. 154(b) by 269 days.

(21) Appl. No.: 16/523,377

(22) Filed: Jul. 26, 2019

(65) Prior Publication Data

US 2021/0025443 A1    Jan. 28, 2021

(51) Int. Cl.
| | |
|---|---|
| *F16F 1/26* | (2006.01) |
| *F16C 11/12* | (2006.01) |
| *F16F 3/02* | (2006.01) |
| *G02B 7/182* | (2021.01) |

(52) U.S. Cl.
CPC .............. *F16C 11/12* (2013.01); *F16F 3/023* (2013.01); *G02B 7/182* (2013.01); *F16C 2300/02* (2013.01); *F16F 2226/04* (2013.01)

(58) Field of Classification Search
CPC .............. F16F 1/26; F16F 3/023; F16C 11/12
See application file for complete search history.

(56) References Cited

U.S. PATENT DOCUMENTS

| | | |
|---|---|---|
| 3,073,584 A | 1/1963 | Troeger |
| 3,124,873 A | 3/1964 | Troeger |
| 3,142,888 A | 8/1964 | Troeger |
| 3,181,851 A | 5/1965 | Troeger |
| 3,181,918 A | 5/1965 | Troeger |
| 3,277,555 A | 10/1966 | Kutash |
| 3,319,951 A | 5/1967 | Seelig |
| 3,465,997 A | 9/1969 | Piske |
| 3,811,665 A | 5/1974 | Seelig |
| 6,479,782 B1 | 11/2002 | Blackburn |
| 6,666,612 B2 | 12/2003 | Lorigny et al. |
| 9,212,691 B2 | 12/2015 | Smith |
| 2006/0061021 A1 | 3/2006 | Dittmar |
| 2018/0142729 A1 | 5/2018 | Lee et al. |
| 2020/0132248 A1 | 4/2020 | Lazzaro |

FOREIGN PATENT DOCUMENTS

| | | |
|---|---|---|
| FR | 2446952 A1 | 8/1980 |
| FR | 2797923 A1 | 3/2001 |

OTHER PUBLICATIONS

EP Search Report dated Dec. 17, 2020 in re EP Application No. 20186066.5.

*Primary Examiner* — Bradley T King
(74) *Attorney, Agent, or Firm* — Coats & Bennett, PLLC

(57) ABSTRACT

A blade flexure assembly that includes first and second mounting structures. Two or more flexure blades are connected to and extend between the first and second mounting structures. Clamping blocks clamp the flexure blades to the mounting structures. The modular design of the assembly provides for replacing one or more of the flexure blades to adjust one or more functional aspects of the assembly.

20 Claims, 10 Drawing Sheets

BLADE FLEXURE ASSEMBLY WITH REPLACEABLE ELEMENTS

TECHNOLOGICAL FIELD

The present disclosure relates generally to the field of blade flexure assemblies and, more specifically the present disclosure relates to the field of blade flexure assemblies with a modular construction.

BACKGROUND

Blade flexure devices generally include opposing mounting structures with intermediate flexure blades that extend between the mounting structures. The devices can be used for a variety of purposes, such as mounting a mirror element in an optical device to a frame. The mounting structures are configured to be attached to the opposing members and the intermediate flexure blades support the mounting structures and provide rotational movement about an axis of rotation formed at the flexure blades.

Existing devices are typically monolithically fabricated or brazed. Monolithically fabricated devices are limited by machining tolerances and surface finishes of the manufacturing processes. The manufacturing processes can affect the repeatability and accuracy of a particular device's performance and the strength, as well as the fatigue performance of the intermediate blades. Further, subtractive and additive manufacturing methods for the monolithically fabricated devices prevent the use of more applicable materials for the intermediate blades. Brazed device are permanently assembled thus preventing removal and/or replacement of the intermediate blades. Slight changes to the flexure element design require fabrication of a new flexure assembly, requiring it to be a separate or separable subassembly from the parent system if flexure changes are to be accommodated.

SUMMARY

One aspect is directed to a blade flexure assembly comprising a plurality of removable flexure blades each having a first end and second end, a plurality of mounting structures each having a curved surface to receive one of the first and second ends of one of the flexure blades, and a plurality of clamping blocks wherein each clamping block clamps one of the first and second ends of the flexure blade to one of the curved surfaces of the mounting structure. Each clamping block has a curved surface with a shape different than the respective curved surface of the mounting structure such that the one of the first and second ends is clamped at two line contacts and a gap exists between the flexure blade and either the mounting structure or clamping block.

In another aspect, the flexure blades comprise material with a higher tensile strength than material of the mounting structures.

In another aspect, fasteners join the mounting structures to the clamping blocks.

In another aspect, each flexure blade comprises a first curved section at the first end, a second curved section at the second end, and an intermediate section between the first and second curved sections with the intermediate section having a different amount of curvature than either of the first and second curved sections.

In another aspect, each flexure blade comprises a curved section with a first radius and each of the curved surfaces of the clamping blocks comprises a second radius with the first radius being different than the second radius.

In another aspect, adjacent ones of the flexure blades cross between the mounting structures.

One aspect is directed to a blade flexure assembly comprising first and second mounting structures that comprise a plurality of receptacles that each have a curved surface. The mounting structures are spaced apart and in an overlapping orientation. A plurality of flexure blades extend between the first and second mounting structures. Each of the flexure blades comprises a first curved section at a first end to fit within one of the receptacles of the first mounting structure and a second curved section at an opposing second end to fit within a second one of the receptacles of the second mounting structure. A plurality of clamping blocks each comprise a curved surface with a different curvature than the curved surfaces of the mounting structures. Fasteners connect the clamping blocks to the mounting structures with the fasteners clamping the flexure blade between the curved surface of one of the mounting structures and the curved surface of one of the clamping blocks.

In another aspect, each curved surface of the mounting structures comprise a radius and the curved surfaces of the clamping blocks comprise a different second radius.

In another aspect, each of the clamping blocks contacts against one of the flexure blades along two line contacts.

In another aspect, a gap is formed between each one of the flexure blades and the mounting structures or between each one of the flexure blades and the clamping blocks.

In another aspect, the first and second curved sections of the flexure blades and the curved surfaces of the mounting structures have substantially equal radii.

In another aspect, each flexure blade comprises an intermediate section that extends between the first curved section and the second curved section with the intermediate section being straight.

In another aspect, adjacent ones of the flexure blades cross between the first and second mounting structures.

In another aspect, each of the mounting structures comprises two of the receptacles.

One aspect is directed to a method of assembling a blade flexure assembly. The method comprises: positioning first and second flexure blades between first and second mounting structures with the first and second flexure blades being positioned in a side-by-side and crossed configuration; securing the first flexure blade to the first mounting structure by clamping a first curved section at a first end of the first flexure blade between the first mounting structure and a first clamping block; securing the first flexure blade to the second mounting structure by clamping a second curved section at a second end of the first flexure blade between the second mounting structure and a second clamping block; securing the second flexure blade to the first mounting structure by clamping a first curved section at a first end of the second flexure blade between the first mounting structure and a third clamping block; securing the second flexure blade to the second mounting structure by clamping a second curved section at a second end of the second flexure blade between the second mounting structure and a fourth clamping block; and contacting each of the first, second, third, and fourth clamping blocks against the respective flexure blade along two line contacts.

In another aspect, the method includes crossing straight intermediate sections of the first and second flexure blades between the first and second mounting structures.

In another aspect, the method includes positioning an intersection between the first and second flexure blades at a midpoint between the first and second mounting structures.

In another aspect, the method includes forming a gap between the clamping blocks and the respective flexure blades.

In another aspect, the method includes inserting fasteners into the clamping blocks and securing the flexure blades and the clamping blocks to the mounting structures.

In another aspect, the method includes positioning the flexure blades and spacing apart the first mounting structure from the second mounting structure.

The features, functions and advantages that have been discussed can be achieved independently in various aspects or may be combined in yet other aspects, further details of which can be seen with reference to the following description and the drawings.

DETAILED DESCRIPTION

Figure 1:
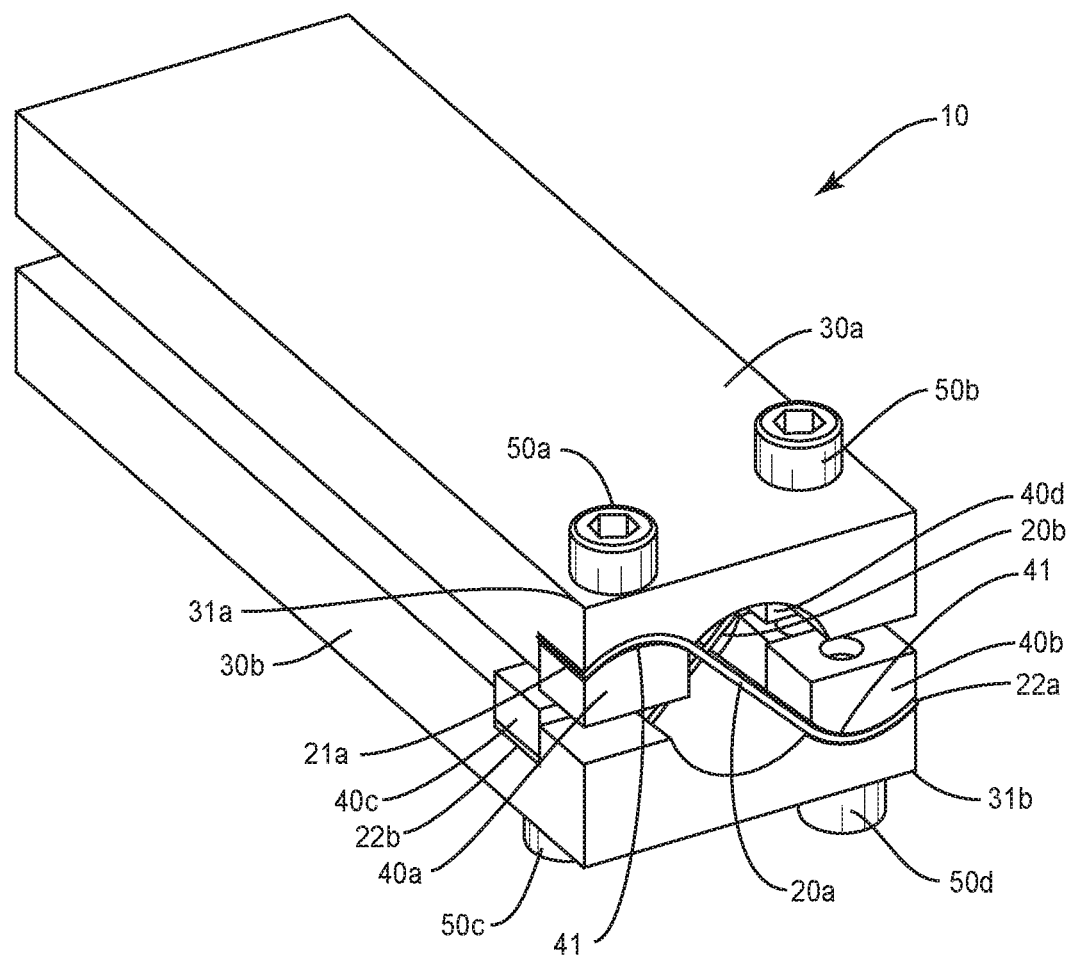
FIG. 1 is perspective view of a blade flexure assembly, according to an example embodiment.

FIG. 1 illustrates a blade flexure assembly 10. The blade flexure assembly 10 includes a plurality of mounting structures 30 and two or more flexure blades 20. In particular, blade flexure assembly 10 includes first and second mounting structures 30a, 30b. Two or more flexure blades 20a, 20b are connected to and extend between the first and second mounting structures 30a, 30b. Clamping blocks 40a, 40b, 40c, and 40d clamp the flexure blades 20a, 20b to the mounting structures 30a, 30b. The modular design of the blade flexure assembly 10 provides for replacing one or more of the flexure blades 20a, 20b to adjust one or more functional aspects of the blade flexure assembly 10.

Figure 2:
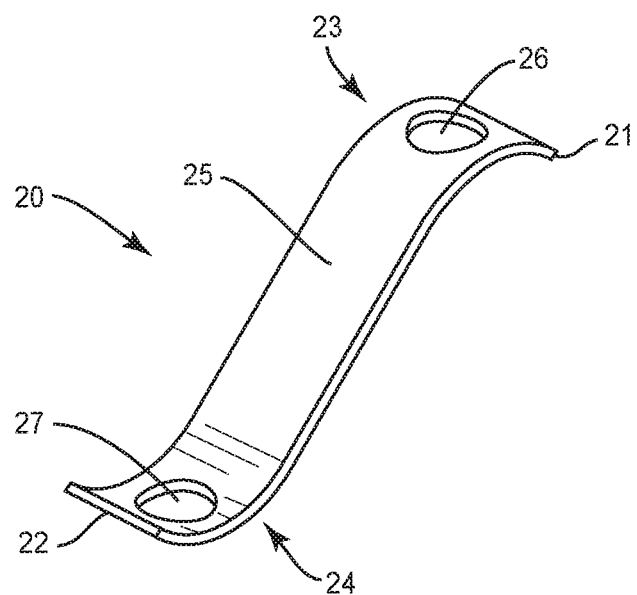
FIG. 2 is perspective view of a flexure blade, according to an example embodiment.

The blade flexure assembly 10 includes two or more flexure blades 20. Flexure blades 20a and 20b are described in more detail with reference to FIGS. 2-4. As illustrated in FIG. 2, each flexure blade 20 includes an elongated length with a first end 21 and opposing second end 22. A first curved section 23 is positioned towards the first end 21, and a second curved section 24 is positioned towards the second end 22. The first and second curved sections 23, 24 can include the same or different curvatures and/or lengths. In one example, one or both of the first and second curved sections 23, 24 begin at the respective ends 21, 22. In another example, one or both of the first and second curved sections 23, 24 are spaced inward from the respective ends 21, 22. A first opening 26 extends through the flexure blade 20 long the first curved section 23, and a second opening 27 extends through the flexure blade 20 along the second curved section 24. An intermediate section 25 extends between the first and second curved sections 23, 24. The intermediate section 25 includes a different amount of curvature than either of the first and second curved sections 23, 24. In one example, the intermediate section 25 is straight.

The flexure blades 20 are relatively thin with a thickness being less than the width and the length. The flexure blades 20 can be constructed from a variety of different materials. Materials include but are not limited to stainless steel alloys, titanium alloys, and high alloy steels. The different flexure blades 20 within a blade flexure assembly 10 can be constructed from the same or different materials. In an example, the flexure blades 20 are constructed from a material with a higher tensile strength than the mounting structures 30.

Figure 3:
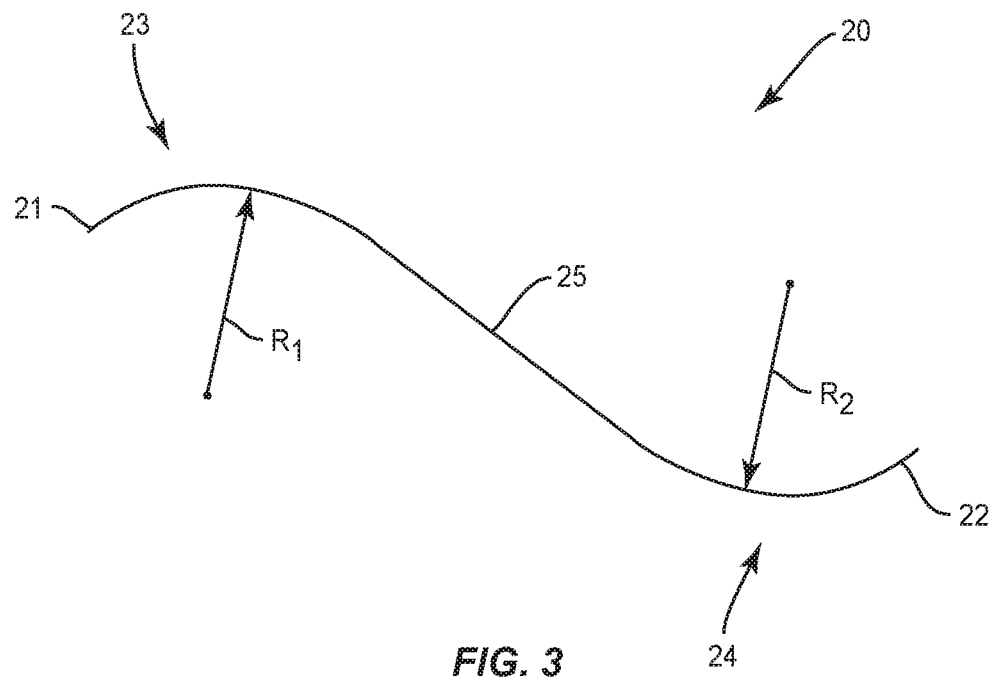
FIG. 3 is schematic side view of a flexure blade, according to an example embodiment.
Figure 4:
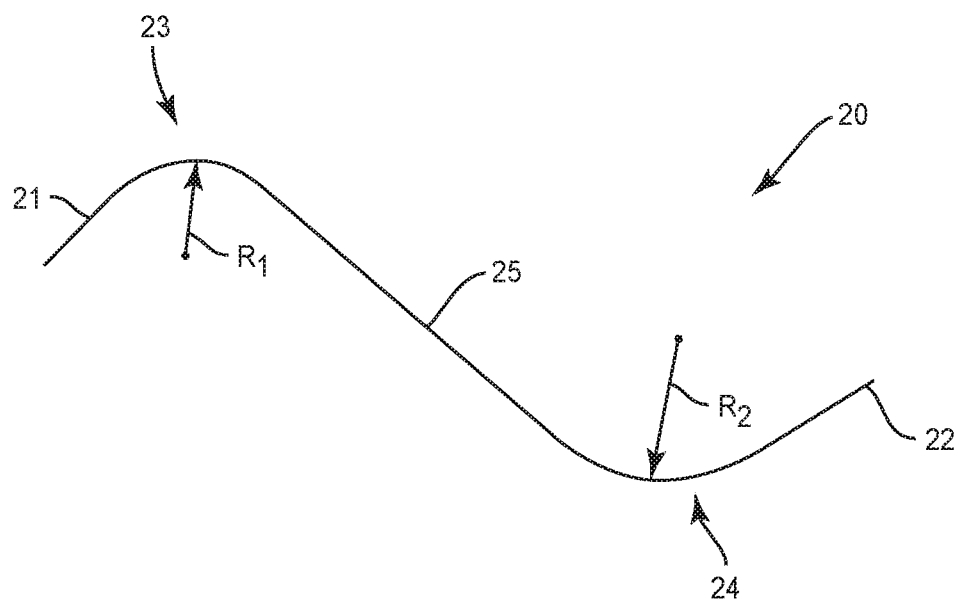
FIG. 4 is schematic side view of a flexure blade, according to an example embodiment.

FIG. 3 is a schematic diagram of a flexure blade 20. The first curved section 23 is positioned at the first end 21 and includes a radius R1. The second curved section 24 is positioned at the second end 22 and includes a radius R2. FIG. 3 includes the first and second curved sections 23, 24 having the same radii R1, R2 and the same lengths. FIG. 4 includes a flexure blade 20 with the first and second curved sections 23, 24 having different radii R1, R2, and lengths.

The intermediate section 25 is straight and extends between the first and second curved sections 23, 24. The intermediate section 25 can include other shapes that include a different curvature than either of the first and second curved sections 23, 24.

Figure 5:
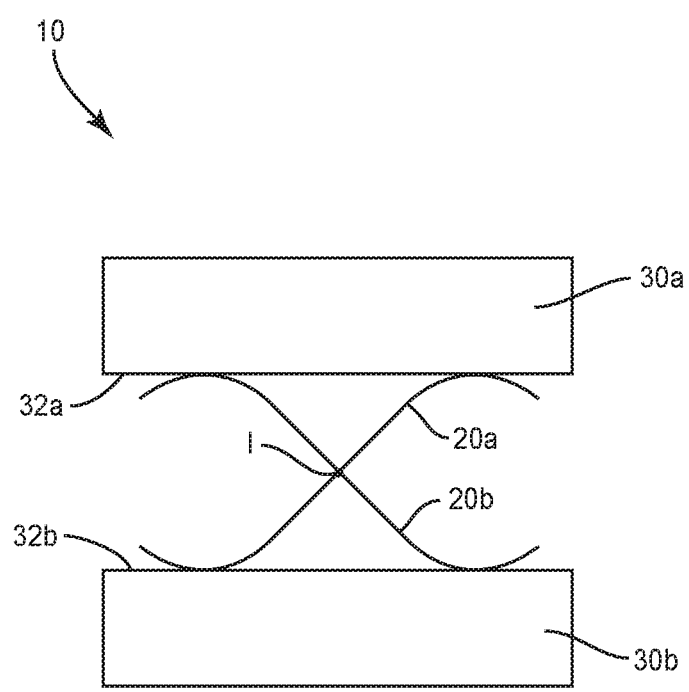
FIG. 5 is a schematic side view of a pair of flexure blades in a cross configuration between first and second mounting structures, according to an example embodiment.

The flexure blades 20 are aligned to cross between the mounting structures 30a and 30b. As illustrated in FIG. 5, the flexure blades 20a, 20b cross at an intersection point I. The intersection point I defines a nominal axis of rotation of the blade flexure assembly 10. In one example, the intersection point I is located midway between the inner sides 32a, 32b of the mounting structures 30a, 30b. In another example, the intersection point I is located closer to one of the inner sides 32a, 32b as the spacing of the intersection point I between the inner sides 32a, 32b can vary. In examples with three or more flexure blades 20, the different intersection points I between adjacent flexure blades 20 can be at the same or different spacings between the mounting structures 30.

Figure 6:
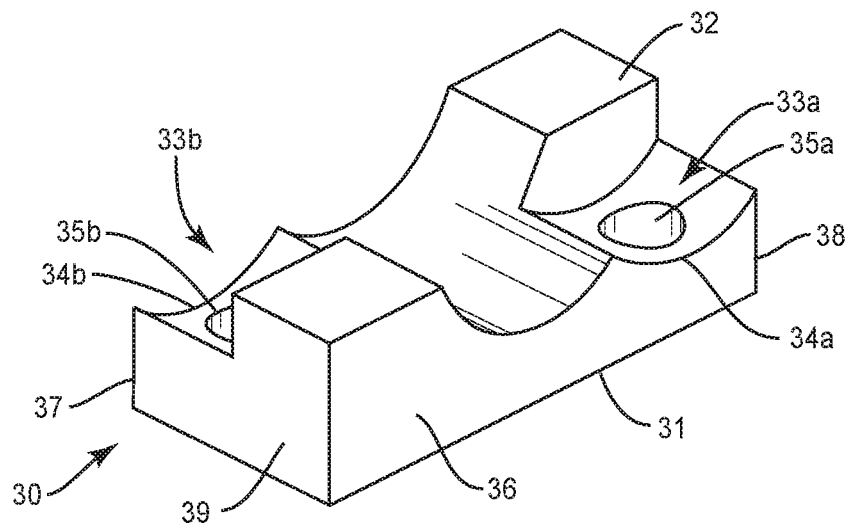
FIG. 6 is perspective view of an inner side of a mounting structure, according to an example embodiment.
Figure 7:
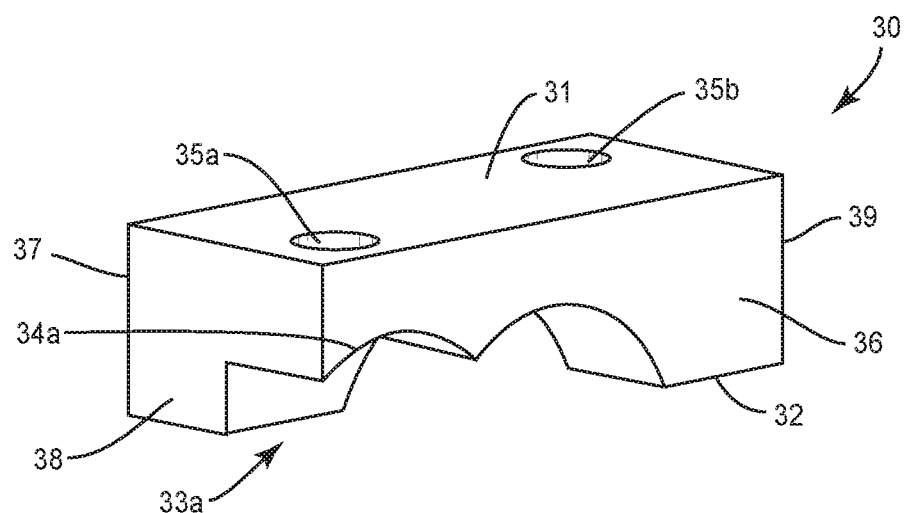
FIG. 7 is perspective view of an outer side of a mounting structure, according to an example embodiment.

Mounting structures 30a and 30b are positioned on opposing sides of the flexure blades 20. Mounting structures 30a and 30b are described in more detail with reference to FIGS. 6 and 7. As illustrated in FIGS. 6 and 7, each mounting structure 30 includes an outer side 31 and an inner side 32.

The outer side 31 faces away from the flexure blades 20 and is shaped and sized to engage with a component. In one example, the outer side 31 is substantially flat. Other examples include various shapes and.

The inner side 32 includes two or more receptacles 33a, 33b each configured to receive a different flexure blade 20. The first receptacle 33a includes a curved surface 34a to receive a first curved section 23 of a first flexure blade 20. The second receptacle 33b includes a second curved surface 34b to receive a second curved section 24 of a second flexure blade 20b. Openings 35a, 35b extend through the mounting structure 30 from the outer side 31 to the curved surfaces 34a, 34b respectively.

Figure 8:
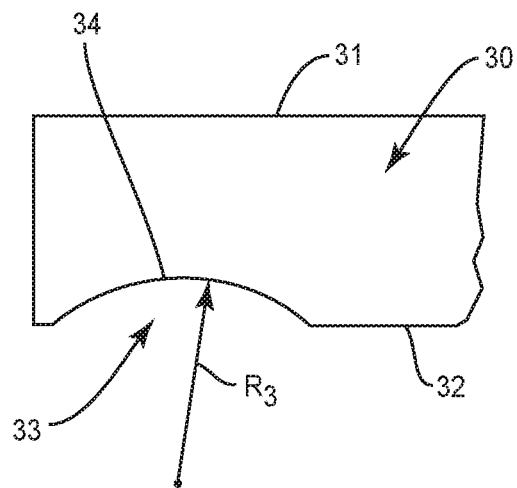
FIG. 8 is a schematic side view of a section of a mounting structure having a receptacle with a curved surface, according to an example embodiment.

FIG. 8 illustrates a schematic view of a receptacle 33 positioned along the inner side 32 of a mounting structure 30. The curved surface 34 of the receptacle 33 has a radius R3 and is configured to receive the first curved section 23 of a flexure blade 20.

Different receptacles 33 on a mounting structure 30 can include the same or different shapes and/or sizes. In one example, each receptacle 33 includes the same radius R3. Other examples can include one or more of the receptacles 33 having a different shape and/or size.

In one example, each mounting structure 30 is shaped and sized to be interchangeable (i.e., can be used as either an upper mounting structure 30a or a lower mounting structure 30b). As illustrated in FIGS. 6 and 7, the receptacles 33a, 33b are aligned in an opposing orientation between a front edge 36 and a back edge 37. That is, the first receptacle 33a is positioned at the front edge 36 and the left edge 38, and the second receptacle 33b is positioned at the back edge 37 and right edge 39. Each of the mounting structures 30a, 30b includes this same configuration and can be used as either upper or lower mounting structures 30a, 30b.

Figure 9:
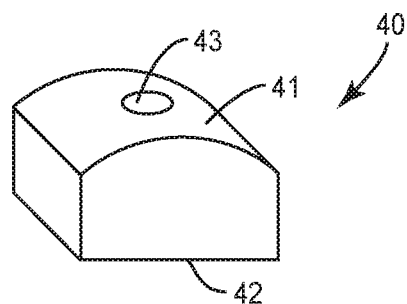
FIG. 9 is a perspective view of a clamping block, according to an example embodiment.
Figure 10:
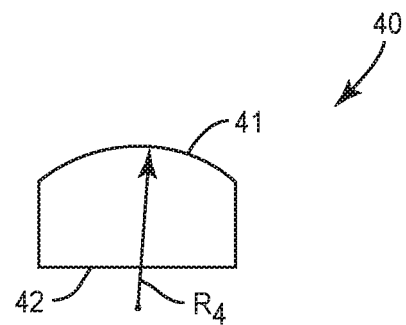
FIG. 10 is a side schematic view of a clamping block, according to an example embodiment.

Each clamping block 40a-d clamps a flexure blade 20 into a receptacle 33. Clamping blocks 40a-d are described in more detail with reference to FIG. 9. FIG. 9 illustrates a clamping block 40 that includes a curved side 41 configured to face towards and contact against the flexure blade 20 when mounted to the mounting structure 30. As illustrated in FIG. 10, the curved side 41 includes a radius R4. The clamping block 40 also includes an opening 43 that extends through the clamping block 40 from the curved side 41 to an opposing second side 42. The opening 43 is shaped and sized to receive a fastener 50 (e.g., fasteners 50a, 50b, 50c, or 50d shown in FIG. 1).

Each of the clamping blocks 40 can include the same or different shapes and/or sizes. In one example, each clamping block 40 includes the same radius R4. Other examples include at least two of the clamping blocks 40 with different radii.

Fasteners 50 are configured to secure the clamping blocks 40 to the mounting structures 30. The fasteners 50 extend through the openings 35 in the mounting structure 30, through an opening 26 or 27 in the flexure blade 20, and into the opening 43 in the clamping block 40. The fasteners 50 can include an enlarged head 51 that is larger than the opening 35 in the mounting structure 30 and is positioned outward beyond the outer side 31. In one example, the fastener 50 includes a length to extend outward beyond the clamping block 40 and the mounting structure 30.

Each flexure blade 20 is clamped between a mounting structure 30 and a clamping block 40. The flexure blade 20 conforms to both the clamping block 40 and the mounting structure 30. In one example, the radius R4 of the clamping block 40 is greater than the radii R1 and R2 of the flexure blade 20. In one example, the radius R4 of the clamping block 40 is greater than the radius R3 of the mounting structure 30 less the thickness of the flexure blade 20).

In one example, the radius R4 of the clamping block 40 is equal or substantially equal to the radius R3 of the mounting structure 30. Other examples include the radius R4 being larger or smaller than the radius R3.

Figure 11A:
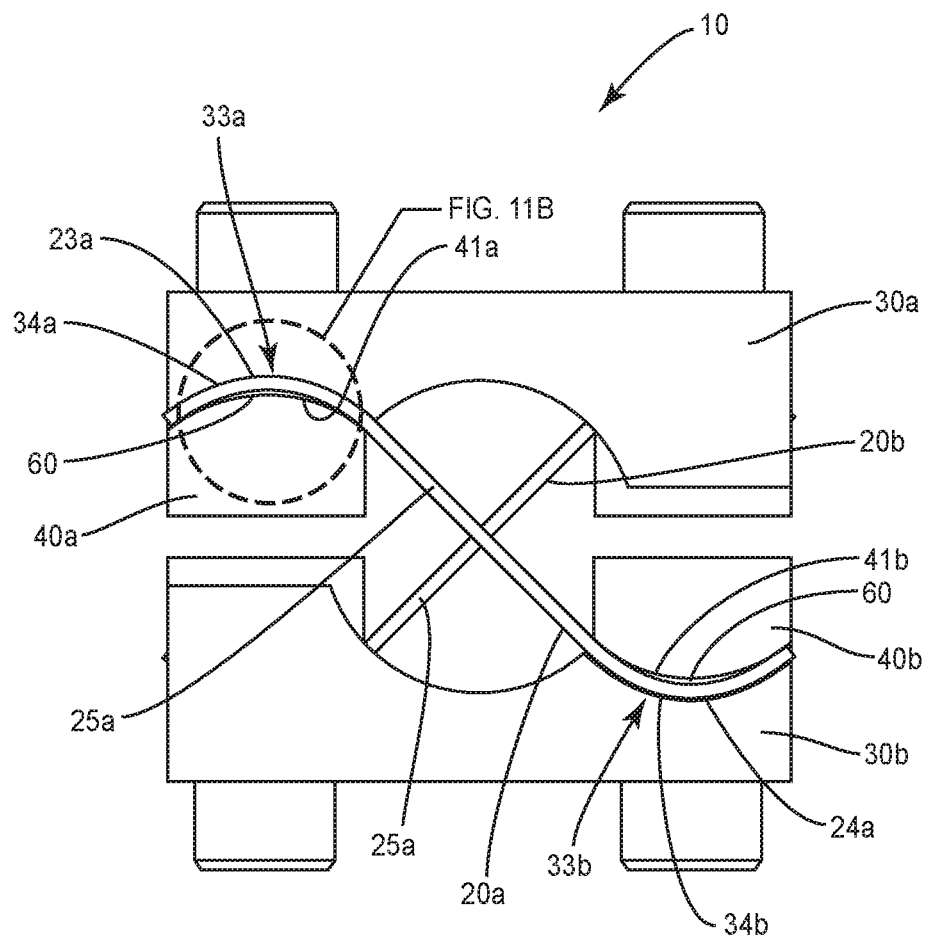
FIG. 11A is a side view of a blade flexure assembly, according to an example embodiment.

As illustrated in FIG. 11A, the first curved section 23 of the flexure blade 20a is clamped and conforms to both the curved surface 34a of the mounting structure 30a and to the clamping block 40a. The second curved section 24 of the flexure blade 20a is clamped and conforms to both the curved surface 34b of the mounting structure 30b and to the clamping block 40b. The radius of clamping block 40a is greater than the radius of curved surface 34a less the thickness of the flexure blade 20a. The radius of the clamping block 40b is greater than the radius of the curved surface 34b less the thickness of the flexure blade 20a.

Figure 11B:
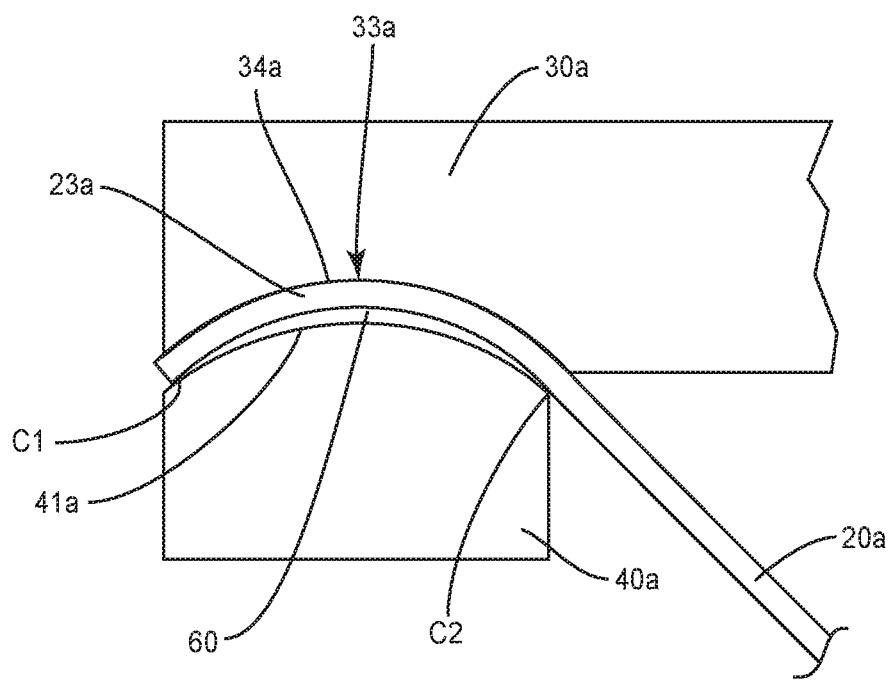
FIG. 11B is a close-up view of a section of the blade flexure assembly of FIG. 11A, according to an example embodiment.

In the example of FIGS. 11A and 11B, a gap 60 is formed between the flexure blade 20a and the curved surface 41a of the clamping block 40a. The curved surface 41a of the clamping block 40a contacts the flexure blade 20 along two line contacts C1, C2. The portion of the curved surface 41a between the line contacts C1, C2 does not contact the flexure blade 20a. The flexure blade 20a contacts against the length of curved surface 34a of the receptacle 33a. In one example, the contact is along the entire length of the curved surface 34a between the line contacts C1, C2. In another example, the contact is along a lesser length of the curved surface 34a. This same two line contacts C1, C2 and gap 60 also is created at the second curved section 24 of the flexure blade 20a.

Figure 11C:
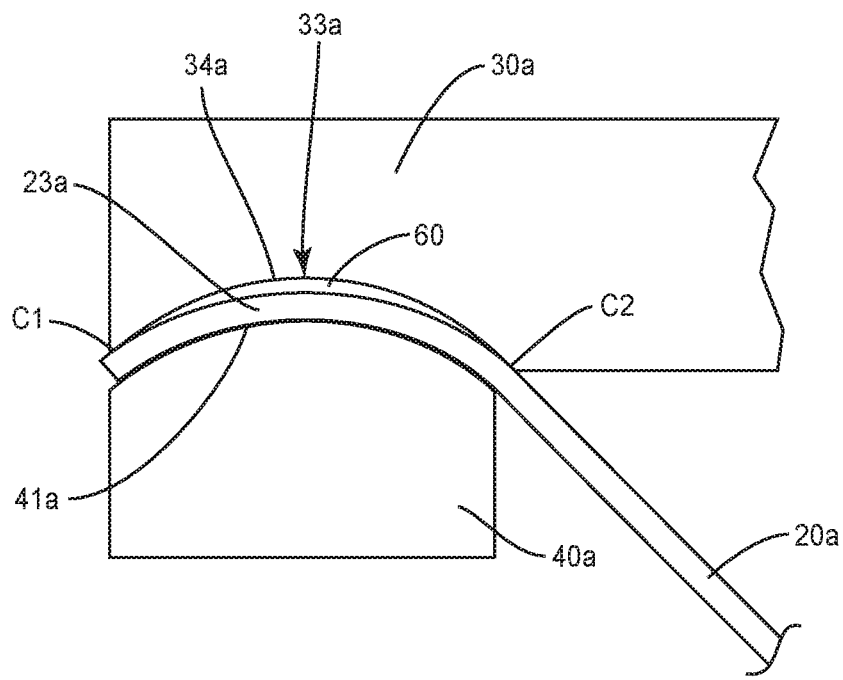
FIG. 11C is a close-up view of an alternative arrangement of a flexure blade clamped between a mounting structure and a clamping block, according to an example embodiment.

FIG. 11C illustrates an example with a gap 60 formed between the flexure blade 20a and the curved surface 34a of the receptacle 33a. The curved surface 34a of the receptacle 33a contacts the flexure blade 20a along two line contacts C1, C2. The curved surface 41a of the clamping block 40a contacts against the curved section 23a of the flexure blade 20a between the two line contacts C1, C2.

In one example, the working portion of the flexure blade 20 is the region that extends between the two line contacts C2 (which includes the intermediate section 25). The line contacts C2 form the outer boundary of the working portion. The line contacts at C1 are incidental to the working of the flexure blade 20.

The modular design of the blade flexure assembly 10 allows the flexure blades 20 to be replaceable and tunable for specific performance needs. Further, the clamping at two line contacts C1, C2 provides a benefit of emulating a monolithic or brazed assembly providing equivalent physical performance characteristics. Still further, the clamping at the line contacts C1, C2 allows for more precisely defining the working length of the flexure blade 20.

Clamping the flexure blades 20 to the mounting structures 30 causes the blade flexure assembly 10 to act like a single monolithic material. The modular design provides for one or more of the flexure blades 20 to be removed and replaced to change the properties of the blade flexure assembly 10 as necessary. For example, a first pair of flexure blades 20 can be clamped between the mounting structures 30. The first pair of flexure blades 20 can be designed for a first use. The first pair of flexure blades 20 can be removed and replaced with a second pair of flexure blades 20 for a different second use. The removal and replacement of the flexure blades 20 is straight-forward with the removable fasteners 50.

Figure 12:
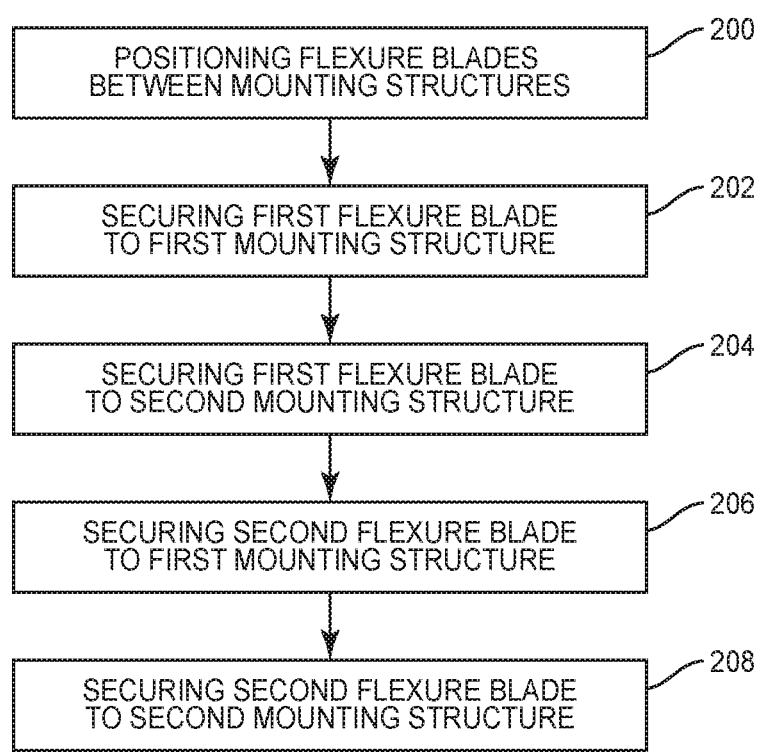
FIG. 12 is a flowchart diagram of a method of assembling a blade flexure assembly, according to an example embodiment.

FIG. 12 illustrates an example method of assembling a blade flexure assembly 10. The first and second flexure blades 20a, 20b are positioned between the first and second mounting structures 30a, 30 (block 200). The first and second flexure blades 20a, 20b are positioned in a side-by-side and crossed configuration. The first flexure blade 20a is secured to the first mounting structure 30a (block 202). This can include clamping a first curved section 23a of the first flexure blade 20a between the first mounting structure 30a and a first clamping block 40a. The first flexure blade 20a is also secured to the second mounting structure 30b (block 204). This can include clamping a second curved section 24a of the first flexure blade 20a between the second mounting structure 30b and a second clamping block 40b.

The second flexure blade 20b is secured to the first mounting structure 30a (block 206). This can include clamping a first curved section 23b of the second flexure blade 20b between the first mounting structure 30a and a third clamping block 40c. The second flexure blade 20b is secured to the second mounting structure 30b (block 208). This can include clamping a second curved section 24b of the second flexure blade 20b between the second mounting structure 30b and a fourth clamping block 40d.

The connection for each of the flexure blades 20a, 20b is along two line contacts at a each of the clamping blocks 40a, 40b, 40c, 40d.

The method can include various orders of assembly. The first flexure blade 20a can be secured to each of the first and second mounting structures 30a, 30b, followed by securing the second flexure blade 20b to each of the first and second mounting structures 30a, 30b. The method can also include attaching each of the first and second flexure blades 20a, 20b to one of the first and second mounting structures 30a, 30b, and then attaching the first and second flexure blades 20a, 20b to the other of the first and second mounting structures 30a, 30b.

Figure 13:
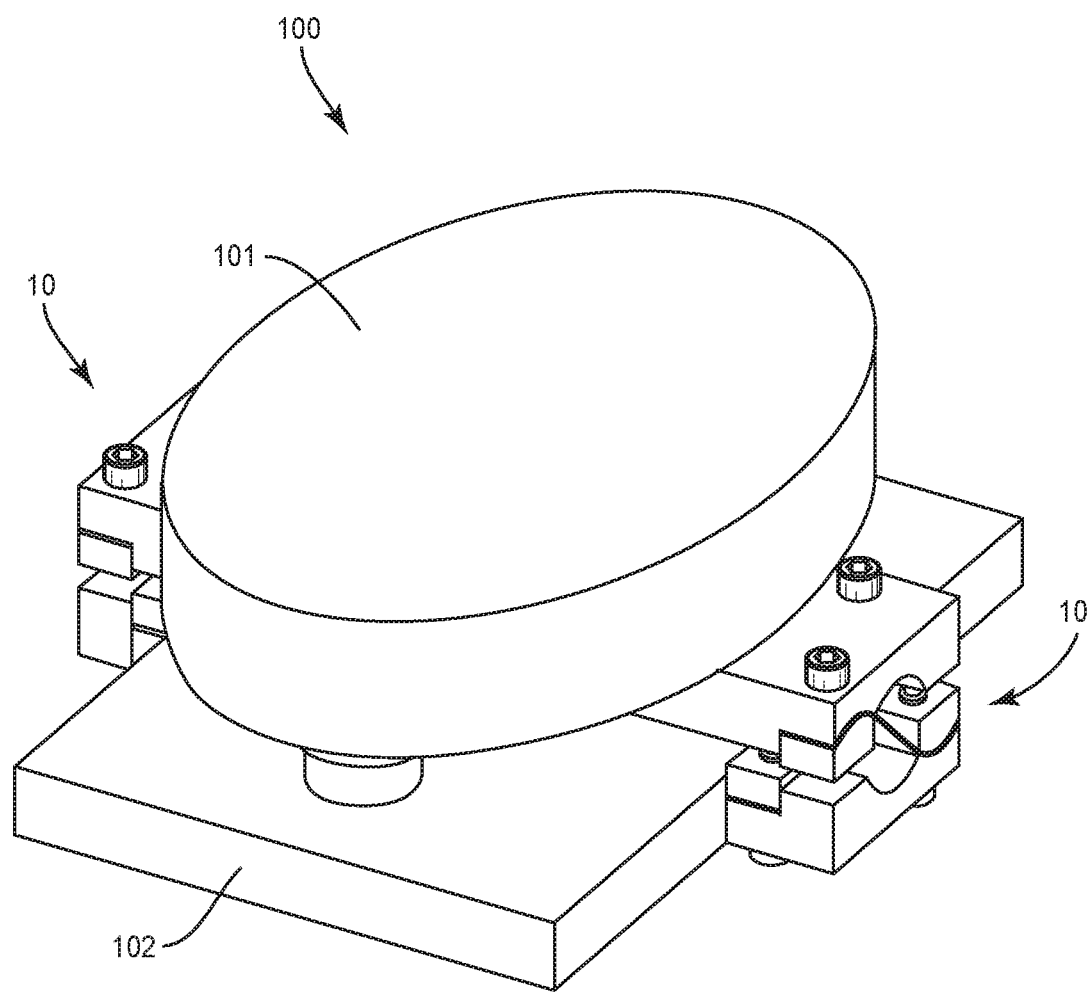
FIG. 13 is a perspective view of blade fixture assemblies incorporated into a fast steering mirror, according to an example embodiment.

The blade flexure assembly 10 can be used in a variety of contexts to provide for rotational movement about the intersection point I. For example, FIG. 13 illustrates a pair of flexure blade assemblies 10 used with a fast steering mirror 100. The flexure blade assemblies 10 provide a flexible support system for mounting a mirror 101 to a support 102. The blade flexure assembly 10 can be used in other systems as well.

By the term "substantially," with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A blade flexure assembly comprising:
a plurality of removable flexure blades, each removable flexure blade having a first end and second end;
a plurality of mounting structures, each mounting structure having a curved surface to receive one of the first and second ends of one of the flexure blades; and
a plurality of clamping blocks, wherein each clamping block clamps one of the first and second ends of the flexure blade to one of the curved surfaces of the mounting structure, each clamping block having a curved surface with a shape different than the respective curved surface of the mounting structure such that the one of the first and second ends is clamped at two line contacts and a gap exists between the flexure blade and either the mounting structure or the clamping block.

2. The blade flexure assembly of claim 1, wherein the flexure blades comprise material with a higher tensile strength than material of the mounting structures.

3. The blade flexure assembly of claim 1, further comprising a plurality of fasteners to join the mounting structures to the clamping blocks.

4. The blade flexure assembly of claim 1, wherein each flexure blade comprises a first curved section at the first end, a second curved section at the second end, and an intermediate section between the first and second curved sections, the intermediate section having a different amount of curvature than either of the first and second curved sections.

5. The blade flexure assembly of claim 1, wherein each flexure blade comprises a curved section with a first radius, and wherein each of the curved surfaces of the clamping blocks comprises a second radius with the first radius being different than the second radius.

6. The blade flexure assembly of claim 1, wherein adjacent ones of the flexure blades cross between the mounting structures.

7. A blade flexure assembly comprising:
first and second mounting structures that comprise a plurality of receptacles that each have a curved surface, the mounting structures being spaced apart and in an overlapping orientation;
a plurality of flexure blades that extend between the first and second mounting structures, each of the flexure blades comprising a first curved section at a first end to fit within one of the receptacles of the first mounting structure and a second curved section at an opposing second end to fit within a second one of the receptacles of the second mounting structure;
a plurality of clamping blocks each comprising a curved surface with a different curvature than the curved surfaces of the mounting structures; and
a plurality of fasteners that connect the clamping blocks to the mounting structures, wherein each of the fasteners clamps one of the flexure blades between the curved surface of one of the first and second mounting structures and the curved surface of one of the clamping blocks.

8. The blade flexure assembly of claim 7, wherein each curved surface of the mounting structures comprise a radius, and wherein each of the curved surfaces of the clamping blocks comprise a different second radius.

9. The blade flexure assembly of claim 8, wherein each of the clamping blocks contacts against one of the flexure blades along two line contacts.

10. The blade flexure assembly of claim 9, further comprising a gap formed between each one of the flexure blades and the mounting structures or between each one of the flexure blades and the clamping blocks.

11. The blade flexure assembly of claim 7, wherein the first and second curved sections of the flexure blades and the curved surfaces of the mounting structures have substantially equal radii.

12. The blade flexure assembly of claim 7, wherein each flexure blade comprises an intermediate section that extends between the first curved section and the second curved section, the intermediate section being straight.

13. The blade flexure assembly of claim 7, wherein adjacent ones of the flexure blades cross between the first and second mounting structures.

14. The blade flexure assembly of claim 7, wherein each of the mounting structures comprises two of the receptacles.

15. A method of assembling a blade flexure assembly, the method comprising:
- positioning first and second flexure blades between first and second mounting structures with the first and second flexure blades being positioned in a side-by-side and crossed configuration;
- securing the first flexure blade to the first mounting structure by clamping a first curved section at a first end of the first flexure blade between the first mounting structure and a first clamping block;
- securing the first flexure blade to the second mounting structure by clamping a second curved section at a second end of the first flexure blade between the second mounting structure and a second clamping block;
- securing the second flexure blade to the first mounting structure by clamping a first curved section at a first end of the second flexure blade between the first mounting structure and a third clamping block;
- securing the second flexure blade to the second mounting structure by clamping a second curved section at a second end of the second flexure blade between the second mounting structure and a fourth clamping block; and
- contacting each of the first, second, third, and fourth clamping blocks against the respective flexure blade along two line contacts.

16. The method of claim 15, further comprising crossing straight intermediate sections of the first and second flexure blades between the first and second mounting structures.

17. The method of claim 15, further comprising positioning an intersection between the first and second flexure blades at a midpoint between the first and second mounting structures.

18. The method of claim 15, further comprising forming a gap between the clamping blocks and the respective flexure blades.

19. The method of claim 15, further comprising inserting fasteners into the clamping blocks and securing the flexure blades and the clamping blocks to the mounting structures.

20. The method of claim 15, further comprising positioning the flexure blades and spacing apart the first mounting structure from the second mounting structure.

* * * * *